United States Patent
Ono

(10) Patent No.: US 7,835,580 B2
(45) Date of Patent: Nov. 16, 2010

(54) ALBUM CREATING APPARATUS, ALBUM CREATING METHOD AND PROGRAM THEREFOR

(75) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1191 days.

(21) Appl. No.: 11/451,405

(22) Filed: Jun. 13, 2006

(65) Prior Publication Data

US 2006/0279555 A1 Dec. 14, 2006

(30) Foreign Application Priority Data

Jun. 13, 2005 (JP) ............................. 2005-172770
May 10, 2006 (JP) ............................. 2006-131962

(51) Int. Cl.
G06K 9/32 (2006.01)
G06K 9/46 (2006.01)
H04N 5/76 (2006.01)

(52) U.S. Cl. ........................ 382/224; 382/294; 382/190; 348/231.2

(58) Field of Classification Search ................. 382/224, 382/284, 294, 190; 358/1.18, 537, 1.14, 358/1.9, 452, 302, 1.15; 345/173, 619, 901, 345/634; 348/231.2, 231.3, 333.05
See application file for complete search history.

(56) References Cited

U.S. PATENT DOCUMENTS 6,636,648 B2 * 10/2003 Loui et al. .................. 382/284
6,771,801 B1 * 8/2004 Fisher et al. ................. 382/112
7,035,467 B2 * 4/2006 Nicponski .................... 382/224

FOREIGN PATENT DOCUMENTS

JP  10-126731 A  5/1998

* cited by examiner

*Primary Examiner*—Sheela C Chawan
(74) *Attorney, Agent, or Firm*—Sughrue Mion, PLLC

(57) ABSTRACT

An album creating apparatus for creating an album with an appropriate layout dependent on the content of the image.

The album creating apparatus according to the present invention includes: an album template storage section for storing a plurality of album templates to define the design form of an album; a unit template storage section for storing a plurality of unit templates to define each design form for partial layout regions continued in each of the plurality of album templates stored in the album template storage section; a unit template selecting section for selecting one unit template from a plurality of album templates stored in the unit template storage section based on the content of the image in each image group classified into each layout region dependent on the content of the image placed on the album; and a layout section for laying out the image included in each image group into the layout region in the unit template selected by the unit template selecting section.

14 Claims, 13 Drawing Sheets

| IMAGE CLASSIFICATION | IMAGE CAPTURING CONDITION ||||| TYPE OF SUBJECT | IMAGE DIRECTION | DIRECTION COMPONENT | DIRECTION OF VANISHING POINT |
|---|---|---|---|---|---|---|---|---|---|
| | FOCAL DISTANCE | WHITE BALANCE | ...... | IMAGE CAPTURING MODE | | | | | |
| #301 | — | — | ... | — | LANDSCAPE | — | — | — |
| #302 | — | — | ... | PORTRAIT | PERSON | — | — | — |
| #303 | — | SUNLIGHT MODE | ... | — | PLURALITY OF PERSONS | LATERAL | — | — |
| #304 | — | — | ... | NIGHT VIEW | — | — | — | — |
| ... | ... | ... | ... | ... | ... | ... | ... | ... |

| DESIGNER | COVER UNIT TEMPLATE | MAIN CONTENT UNIT TEMPLATE | BACK COVER UNIT TEMPLATE |
|---|---|---|---|
| DESIGNER D1 | 401 #301 461, 402 #302 462, ... | 411 #301 #303 463 464, 412, 413, 414 465 466, 415 467 468 469, 416, ... | 421, 422, ... |
| DESIGNER D2 | 431, 432, ... | 441, 442, 443, ... | 451, 452, ... |
| ... | ... | ... | ... |

FIG. 4

| VALUE (%) | CURVATURE OF LAYOUT FRAME | DIFFERENCE OF THE NUMBER OF IMAGE FRAMES | DIFFERENCE OF TOTAL AREA FOR LAYOUT FRAMES | ...... |
|---|---|---|---|---|
| RATIO 1 | DEGREE OF COINCIDENCE 811 | DEGREE OF COINCIDENCE 812 | DEGREE OF COINCIDENCE 813 | ...... |
| RATIO 2 | DEGREE OF COINCIDENCE 821 | DEGREE OF COINCIDENCE 822 | DEGREE OF COINCIDENCE 823 | ...... |
| ...... | | ...... | ...... | ...... |

| SUBSEQUENT PAGE / PREVIOUS PAGE | $T_0$ | $T_1$ | $T_2$ | ... |
|---|---|---|---|---|
| $T_0$ | $\beta_{00}$ | $\beta_{01}$ | $\beta_{02}$ | ⋮ |
| $T_1$ | $\beta_{10}$ | $\beta_{11}$ | $\beta_{12}$ | ⋮ |
| $T_2$ | $\beta_{20}$ | $\beta_{21}$ | $\beta_{22}$ | ⋮ |
| ... | ...... | ...... | ...... | ⋱ |

| DIFFERENCE OF CHARACTERISTIC COLOR | DIFFERENCE OF FOCAL DISTANCE | DIFFERENCE OF IMAGE CAPTURING MODE | DIFFERENCE OF TYPE OF SUBJECT | ...... |
|---|---|---|---|---|
| COLOR DIFFERENCE → DEGREE OF COINCIDENCE 1011 | DISTANCE DIFFERENCE → DEGREE OF COINCIDENCE 1012 | SAME → DEGREE OF COINCIDENCE 1013 | SAME → DEGREE OF COINCIDENCE 1014 | ...... |
| COLOR DIFFERENCE → DEGREE OF COINCIDENCE 1021 | DISTANCE DIFFERENCE → DEGREE OF COINCIDENCE 1022 | DIFFERENT → DEGREE OF COINCIDENCE 1023 | DIFFERENT → DEGREE OF COINCIDENCE 1024 | ...... |
| ...... | ...... | ...... | ...... | |

*FIG. 10*

| UNIT TEMPLATE / IMAGE GROUP | $T_0$ | $T_1$ | $T_2$ | ...... |
|---|---|---|---|---|
| $I_0$ | $r_{00}$ | $r_{01}$ | $r_{02}$ | ...... |
| $I_1$ | $r_{10}$ | $r_{11}$ | $r_{12}$ | ...... |
| ...... | ...... | ...... | ...... | ...... |

*FIG. 12*

ALBUM CREATING APPARATUS, ALBUM CREATING METHOD AND PROGRAM THEREFOR

CROSS REFERENCE

The present application relates to and claims priority from a Japanese Patent Application No. 2005-172770 filed in Japan on Jun. 13, 2005, the contents of which are incorporated herein by reference for all purpose.

BACKGROUND OF THE INVENTION

1. Field of the Invention

The present invention relates to an album creating apparatus, an album creating method, and a program therefor. Particularly, the present invention relates to an album creating apparatus and an album creating method for creating an album, and a program for the album creating apparatus.

2. Related Art

Conventionally, a technology for creating an album has been known that the map of travel destination is disposed at the center of a screen, images are disposed around the map based on tag information such as position information and image-capturing time information associated with image data captured in traveling, and the images and the image-capturing positions on the map are connected by lines, so that the relationship between the map and the images can be identified, for example as disclosed in Japanese Patent Application Publication No. 10-126731.

However, the above-described conventional art does not disclose a technology for appropriately laying out an image based on the type of the image stored in each page of an album. For example, it is preferred that a page layout suitable for a landscape image is applied to a page in which the landscape image is mainly laid out. Meanwhile, it is preferred that a page layout suitable for a snapshot of a person is applied to a page in which the snapshot of the person is mainly laid out. Accordingly, preferably the layout is not fixed to each page but is flexibly determined based on the image stored in each page. However, an album creator has to determine the layout dependent on the content of the image in consideration of the design for the whole album, so that a lot of work is required to create an album.

SUMMARY OF THE INVENTION

Thus, it is an object of the present invention to provide an album creating apparatus, an album creating method and an album creating program which are capable of solving the problem accompanying the conventional art. The above and other objects can be achieved by combining the features recited in independent claims. Then, dependent claims define further effective specific example of the present invention.

A first aspect of the present invention provides an album creating apparatus. The album creating apparatus includes: an album template storage section for storing a plurality of album templates to define a design form of an album; a unit template storage section for storing a plurality of unit templates to define the design form of partial layout regions which continue in each of the plurality of album templates stored in the album template storage section; an image storage section for storing a plurality of images placed on the album; an image classification section for classifying, for each layout region in which the design form is defined by the unit template, the plurality of images stored in the image storage section; a unit template selecting section for selecting a first unit template among a plurality of first unit templates which are included in each of the plurality of album templates stored in the unit template storage section based on the content of the image included in a first image group classified by the image classification section, and for selecting a second unit template among a plurality of second unit templates which are included in each of the plurality of album templates stored in the unit template storage section based on the content of the image included in a second image group classified by the image classification section; and an image layout section for laying out the image included in the first image group classified by the image classification section into the layout region in the first unit template selected by the unit template selecting section, and for laying out the image included in the second image group classified by the image classification section into the layout region in the second layout template selected by the unit template selecting section.

The unit template storage section may include a first design form template storage section for storing a unit template to define a design form similar to a first design form and a second design form template storage section for storing a unit template to define a design form which is different from the first design form and is similar to a second design form. Selecting one of the plurality of first unit templates stored in the first design form template storage section, the unit template selecting section may select one of the plurality of second unit templates stored in the first design form template storage section. Meanwhile, selecting one of the plurality of first unit templates stored in the second design form template storage section, the unit template selecting section may select one of the plurality of second unit templates stored in the second design form template storage section.

The first design form template storage section may store a unit template to define a design form designed by a first designer. The second design form template storage section may store a unit template to define a design form designed by a second designer.

The unit template selecting section may include a first unit template selecting section for selecting one of the plurality of first unit templates stored in the unit template storage section based on the content of the image included in the first image group classified by the image classification section, a template similarity calculating section for calculating the similarity between the first unit template selected by the first unit template selecting section and each of the plurality of second unit templates stored in the unit template storage section, and a second unit template selecting section for selecting one of the second unit templates stored in the template similarity calculating section, of which similarity calculated by the template similarity calculating section is higher than a predetermined similarity.

The similarity calculating section may calculates the similarity based on the shape of an image layout frame defined in the first unit template selected by the first unit template selecting section, and the shape of an image layout frame defined in each of the plurality of second unit templates stored in the unit template storage section.

The unit template storage section stores a plurality of cover unit templates to define the design form of the cover of the album, a plurality of main content unit templates to define the design form of the main content of the album and a plurality of back cover unit templates to define the design form of the back cover of the album. The unit template selecting section may include a cover unit template selecting section for selecting one of the plurality of cover unit templates stored in the unit template storage section based on the content of the image classified into the layout region for the cover of the album by the image classification section, a main content unit template selecting section for selecting one of the plurality of main content unit templates stored in the unit template storage section based in the content of the image classified into the layout region for the main content of the album and a back cover unit template selecting section for selecting one of the plurality of back cover unit templates stored in the back cover unit template storage section based on the content of the image classified into the layout region for the back cover of the album by the image classification section.

The album creating apparatus further includes an image classification storage section for storing the classification of the image to be laid out into an image layout frame in association with the image layout frame defined in each of the plurality of unit templates stored in the unit template storage section, an image classification extracting section for extracting the classification of the image included in the image group classified by the image classification section and a degree of matching calculating section for calculating, for unit template, the degree of matching of the plurality of unit templates stored in the unit template storage section with the image group classified into each layout region by the image classification section by comparing the classification of the image extracted by the image classification extracting section with the image classification stored in the image classification storage section. The unit template selecting section may preferentially select the first unit template calculated by the degree of matching calculating section as that the degree of matching with the first image group classified by the image classification section is higher. Additionally, the unit template storage section may preferentially select the second unit template calculated by the degree of matching calculating section as that the degree of matching with the second image group classified by the image classification section is higher.

The album creating apparatus further includes an image capturing condition storage section for storing the image capturing condition for each of the plurality of images stored in the image storage section. The image classification storage section stores the image capturing condition at image capturing as the classification of the image to be laid out into the image layout frame. The image classification extracting section may extract the image capturing condition stored in the image capturing storage section as the classification of the image included in the image group classified by the image classification section. The degree of matching calculating section may calculate, for each unit template, the degree of matching of the plurality of unit templates stored in the unit template storage section with the image group classified in each of the layout regions by the image classification section.

The image capturing condition storage section may store the focal distance for each of the plurality of images stored in the image storage section. The image classification storage section may store the focal distance at image capturing as the classification of the image to be laid out into the image layout frame. The image classification extracting section extracts the focal distance stored in the image capturing condition storage section as the classification of the image included in the image group classified by the image classification section. The degree of matching calculating section may calculate, for each unit template, the degree of matching of the plurality of unit templates stored in the unit template storage section with the image group classified into each layout region by the image classification section by comparing the focal distance extracted by the image classification extracting section with the focal distance stored in the image classification storage section.

The image capturing condition storage section may store an image capturing mode for each of the plurality of images stored in the image storage section. The image classification storage section may store the image capturing mode at image capturing as the classification of the image to be laid out into the image layout frame. The image classification extracting section may extract the image capturing mode stored in the image capturing condition storage section as the classification of the image included in the image group classified by the image classification section. The degree of matching calculating section may calculate, for each unit template, the degree of matching of the plurality of the unit templates stored in the unit template storage section with the image group classified in each layout region by the image classification section by comparing the image capturing mode extracted by the image classification extracting section with the image capturing mode stored in the image classification storage section.

The image classification storage section stores the type of a subject included in the image as the classification of the image to be laid out into the image layout frame. The image classification extracting section may extract the type of the subject included in the image based on the content of the image included in the image group classified by the image classification section. The degree of matching calculating section may calculate, for each unit template, the degree of matching of the plurality of unit templates stored in the unit template storage section with the image group classified into each layout region by the image classification section by comparing the type of the subject extracted by the image classification extracting section with the type of the subject stored in the image classification storage section.

The album creating apparatus further includes an image group selecting condition storage section for storing a selecting condition for the classification of the image included in the image group among the plurality of image groups to select the plurality of image groups classified into the continuous layout regions. The image classification section may include an image group dividing section for dividing the plurality of images stored in the image storage section into the plurality of image groups, an image group coincidence calculating section for calculating the degree of coincidence of image group indicative of the degree of coincidence with the selecting condition stored in the image group selecting condition storage section among the plurality of image groups divided by the image group dividing section and an, image group allocating section for preferentially classifying the image group calculated by the image group coincidence calculating section as that the degree of coincidence with the first image group classified into the first layout region is higher.

The unit template selecting section may include a unit template selecting condition storage section for storing a selecting condition for the design form defined by the unit template among the plurality of unit templates to select the plurality of unit templates in which the design form for each of the continuous layout regions is defined, a unit template coincidence calculating section for calculating the degree of coincidence of unit template indicative of the degree of coincidence with the selecting condition stored in the unit template selecting condition storage section for the plurality of unit templates stored in the unit template storage section based on the design form defined by the plurality of unit templates stored in the unit template storage section and a first unit template selecting section for selecting a first unit template among the plurality of first unit templates stored in the unit template storage section based on the content of the image included in the first image group classified into the first layout region by the image classification section. The album creating apparatus may further include an optimum layout determining section for selecting, for each combination of the plurality of image groups divided by the image group dividing section and the plurality of second unit templates stored in the unit template storage section, the second unit template to define the design form of the second layout region based on the degree of coincidence of the unit template with the first template selected by the first template selecting section calculated by the template coincidence calculating section, the degree of coincidence of image group with the first image group calculated by the image group coincidence calculating section, and the degree of matching of the second unit template with the image group calculated by the degree of matching calculating section.

A second aspect of the present invention provides an album creating method. The album creating method includes the steps of: storing a plurality of album templates to define a design form of an album; storing a plurality of unit templates to define the design form of partial layout regions which continue in each of the plurality of album templates stored in the album template storing step; storing a plurality of images placed on the album; classifying, for each layout region in which the design form is defined by the unit template, the plurality of images stored in the image storing step; selecting one of a plurality of first unit templates which are included in each of the plurality of album templates stored in the unit template storing step based on the content of the image included in a first image group classified by the image classifying step, and selecting one of a plurality of second unit templates which are included in each of the plurality of album templates stored in the unit template storing step based on the content of the image included in a second image group classified in the image classifying step; laying out the image included in the first image group classified in the image classifying step into the layout region in the first unit template selected in the unit template selecting step, and laying out the image included in the second image group classified in the image classifying step into the layout region in the second layout template selected in the unit template selecting step.

A third aspect of the present invention provides a program for an album creating apparatus for creating an album. The program operates the album creating apparatus to function as: an album template storage section for storing a plurality of album templates to define a design form of an album; a unit template storage section for storing a plurality of unit templates to define the design form of partial layout regions which continue in each of the plurality of album templates stored in the album template storage section; an image storage section for storing a plurality of images placed on the album; an image classification section for classifying, for each layout region in which the design form is defined by the unit template, the plurality of images stored in the image storage section; a unit template selecting section for selecting a first unit template among a plurality of first unit templates which are included in each of the plurality of album templates stored in the unit template storage section based on the content of the image included in a first image group classified by the image classification section, and for selecting a second unit template among a plurality of second unit templates which are included in each of the plurality of album templates stored in the unit template storage section based on the content of the image included in a second image group classified by the image classification section; and an image layout section for laying out the image included in the first image group classified by the image classification section into the layout region in the first unit template selected by the unit template selecting section, and for laying out the image included in the second image group classified by the image classification section into the layout region in the second layout template selected by the unit template selecting section.

Here, all necessary features of the present invention are not listed in the summary of the invention. The sub-combinations of the features may become the invention.

According to the present invention, an album having an appropriate layout dependent on the content of images can be easily created.

BRIEF DESCRIPTION OF THE DRAWINGS

FIG. 3 shows an example of the classification of the image designated in a layout frame;

FIG. 4 shows example of unit templates;

FIG. 8 is a table showing an example of data stored in a unit template selecting condition storage section;

FIG. 9 shows an example of the degree of coincidence β of unit template calculated in all the sets of unit templates;

FIG. 10 is a table showing an example of data stored in an image group selecting condition storage section 266;

FIG. 12 shows an example of the degree of matching γ calculated in all the sets of image groups and unit templates;

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
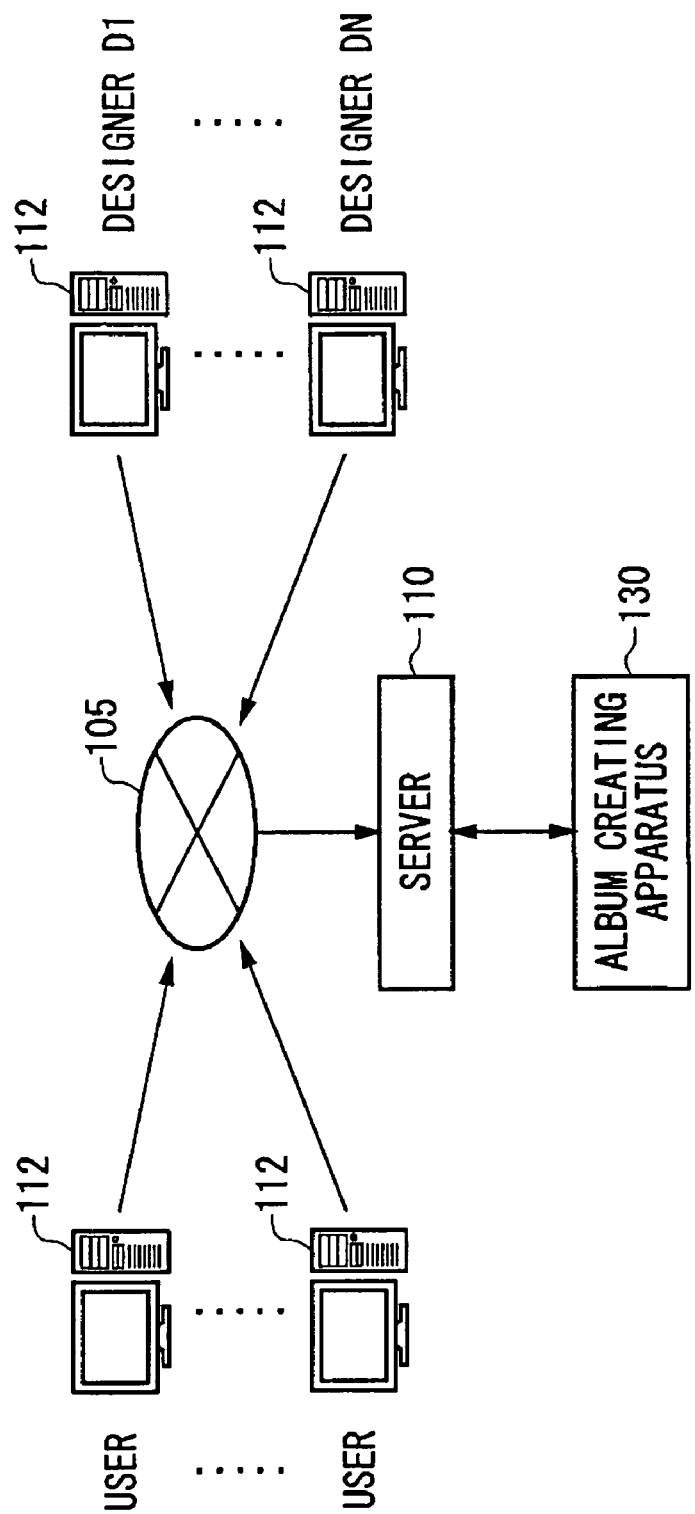
FIG. 1 is conceptual diagram of an album creating system 170 according to an embodiment.

FIG. 1 is conceptual diagram of an album creating system 170 according to an embodiment of the present invention. The album creating system 170 includes a server 110, a client 112 and an album creating apparatus 130. The server 110 receives layout data for the album designed by designers D1-DN from a client 12 of the designers through a communication line 105 such as Internet and stores the same for each designer. Here, the layout data may be a template including a layout frame to define the position and the size of the image in each page of the album. Additionally, the content of the image such as a landscape image and a personal image to be laid out into each layout frame may be designated in each layout frame.

Then, the server 110 receives the image data captured by a user from the client of the user 112 through the communication line 105. Additionally, the server 110 receives an instruction on designating a designer who creates an album from the client 112 of the user. Then, the server 110 transmits the image data received from the client 112 of the user and the designer designated by the user to the album creating apparatus 130.

The album creating apparatus 130 receives the image data including the image to be stored in the album from the server 110 and allocates the same to each page. Then, the album creating apparatus 130 applies the appropriate layout data used for each page based on the number of images allocated to each page and the subject included in the image among the layout data created by the designer designated by the user to create album data.

Then, the server 110 receives the album data created by the album creating apparatus 130 and transmits the same to the client 112 of the user through the communication line 105. Here, the album creating apparatus 130 may output the album as a printed matter. The server 110 may receive the image data and/or the layout data from a recording medium such as a semiconductor memory.

As described above, the album creating apparatus 130 can appropriately lay out the image based on the content of the image. At this time, the album crating apparatus 130 can select the layout data used for creating an album among the layout data set prepared by the designer designated by the user and lay out each page to create an entirely unified album.

Figure 2:
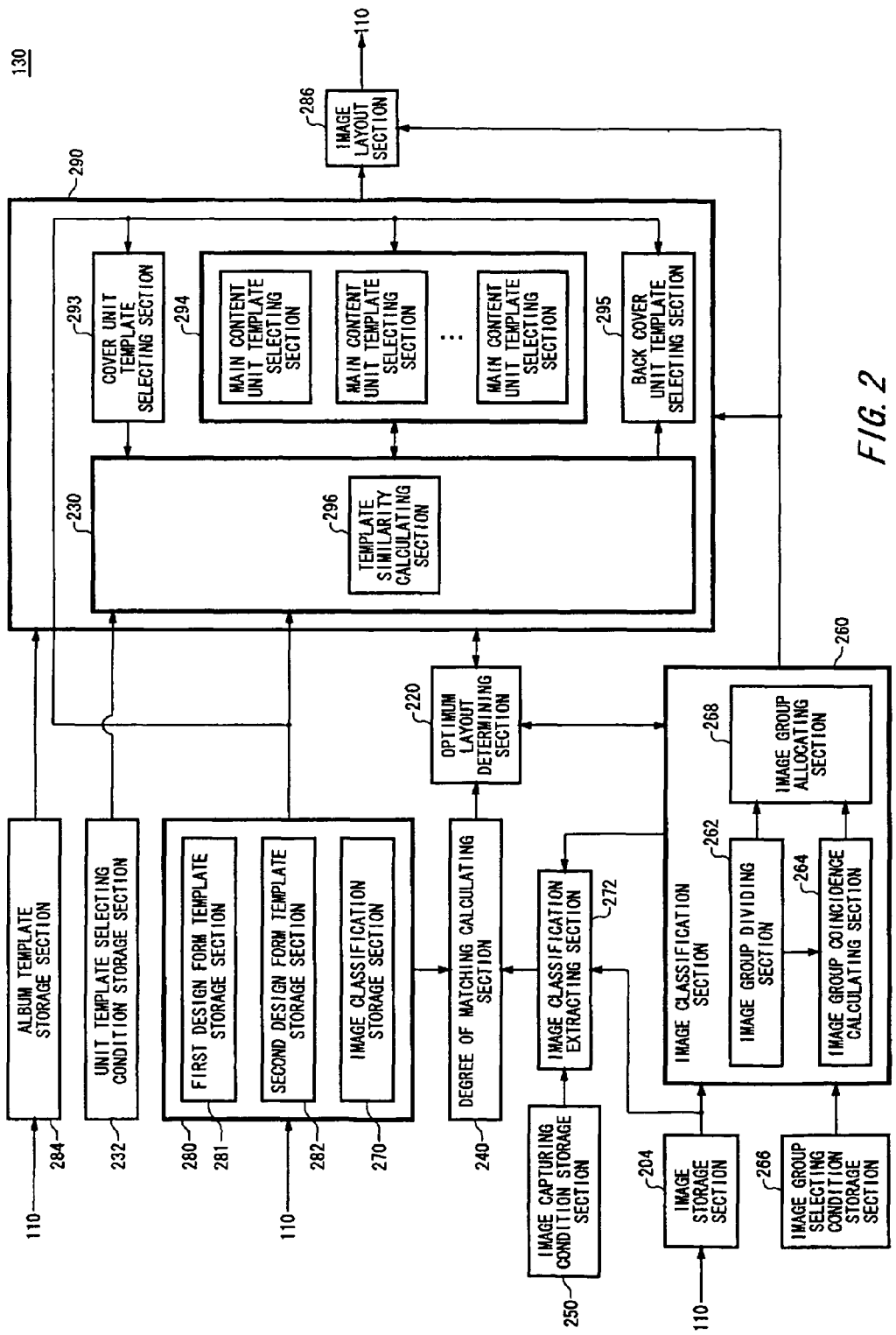
FIG. 2 shows an example of a block configuration of an album creating apparatus 130.

FIG. 2 shows an example of a block configuration of an album creating apparatus 130. The album creating apparatus 130 includes an image storage section 204, an image classification section 260, an album template storage section 284, an image layout section 286, a unit template storage section 280, a unit template selecting section 290, a unit template selecting condition storage section 232, an image capturing condition storage section 250, a degree of matching calculating section 240, an image classification extracting section 272, an image group selecting condition storage section 266 and an optimum layout determining section 220. The unit template storage section 280 includes a first design form template storage section 281, a second design form template storage section 282, and an image classification storage section 270. Additionally, the unit template selecting section 290 includes a cover unit template selecting section 293, a main content unit template selecting section 294, a back cover unit template selecting section 295, and a unit template coincidence calculating section 230. The image classification section 260 includes an image group dividing section 262, an image group coincidence calculating section 264 and an image group allocating section 268. The unit template coincidence calculating section 230 includes a template similarity calculating section 296. The image classification section 260 includes an image group dividing section 262, an image group allocating section 268 and an image group coincidence calculating section 264.

The image storage section 204 stores a plurality of images placed on the album. Here, the image according to the present embodiment may be an image captured by an image capturing apparatus such as a camera.

The album template storage section 284 stores a plurality of album templates to define the design form of the album. The unit template storage section 280 stores a plurality of unit template to define the design form of a part of layout regions continued in each of the plurality of album templates, respectively. Here, the layout region according to the present embodiment may be a page of the album and a facing page. Additionally, the layout region may be a partial region of one page of the album and the facing page, and may be the combination of one page of the album and the facing page.

The image classification section 260 classifies the plurality of images stored in the image storage section 204 in each layout region to define the design form by the unit template based on the content of the image stored in the image storage section 204. Specifically, the image classification section 260 classifies the images into each layout region based on the image capturing time and/or image capturing position. Additionally, the image classification section 260 may classify the images into each layout region based on the subject included in the image.

For example, the image classification section 260 classifies the plurality of images stored in the image storage section 204 into each page of the album dependent on the image capturing position. For example, the image classification section 260 may classify the images into each image capturing region judged by the image capturing position. Additionally, the image classification section 260 may classify the plurality of images stored in the image storage section 204 into each page of the album based on the image capturing time. For example, the image classification section 260 may classify the images into each page by age. Additionally, the image classification section 260 may classify the plurality of images stored in the image storage section 204 into each page of the album based on the subject included in the image. More specifically, the image storage section 204 stores information of the subject included in the image, i.e. subject type information such as a person, an animal and a landscape in association with the image. Additionally, when a person is included in the image as the subject, the image storage section 204 extracts the amount of characteristic of the person and stores the extracted amount of characteristic of the person as subject information in association with the image. Here, the amount of characteristic of the person may be the shape of the outline of a face, the shape of the characteristic parts in the face, such as an eye, a nose and a mouth, the position of each part in the whole face or the positional relationship between each part. Then, the image classification section 260 classifies the plurality of images stored in the image storage section 204 into each page of the album based on the subject information in association with the image. For example, the image classification section 260 may classify the images of which type of the subject is similar into the same page.

The unit template selecting section 290 selects one of a plurality of first unit templates included in each of the plurality of album templates stored in the unit template storage section 280 based on the content of the image included in a first image group classified by the image classification section 260. Additionally, the unit template selecting section 290 selects one of a plurality of second unit templates included in each of the plurality of album templates stored in the unit template storage section 280 based on the content of the image included in a second image group classified by the image classification section 260.

For example, the unit template storage section 280 may store the content of the image to be laid out into the layout frame for the image designated in the unit template. For example, the unit template storage section 280 stores the type of the image to be laid out into the layout frame in association with each layout frame. The type of the image may be the type of the object included in the image. Additionally, the type of the image may be the type of the subject and the image capturing condition provided that the image is captured image. Then, the unit template selecting section 290 judges the type of each image included in the image group and selects the unit template having the layout frame being capable of fitting the type of each image therein.

Then, the image layout section 286 lays out the image included in the first image group classified by the image classification section 260 into the layout region in the first unit template selected by the unit template selecting section 290. Additionally, the image layout section 286 lays out the image included in the second image group classified by the image classification section 260 into the layout region in the second unit template selected by the unit template selecting section 290. Thereby the album creating apparatus 130 can create the album with the appropriate layout based on the content of the image.

The first design form template storage section 281 stores the unit template to define the design form similar to the first design form. The second design form template storage section 282 stores the unit template to define the design form similar to the second design form different from the first design. For example, the first design form template storage section 281 stores the unit template to design the design form designed by the first designer. The second design form template storage section 282 stores the unit template to define the design form designed by the second designer.

Selecting one of the plurality of first unit templates stored in the first design form template storage section 281, the unit template selecting section 290 selects one of the plurality of second unit templates stored in the first design form template storage section 281. Additionally, selecting one of the plurality of first unit templates stored in the second design form template storage section 282, the unit template selecting section 290 selects one of the plurality of second unit templates stored in the second design form template storage section 282. Thereby the album creating apparatus 130 can create the album with the unified design.

The unit template storage section 280 may store a plurality of cover unit templates to define the design form of the cover of the album, a plurality of main content unit templates to define the design form of the main content of the album and a plurality of back cover unit templates to define the design form of the back cover of the album.

Then, the cover unit template selecting section 293 selects one of the plurality of cover unit templates stored in the plurality of cover unit template stored in the unit template storage section 280. Then, the main content unit template selecting section 294 selects one of the plurality of main content unit templates stored in the unit template storage section 280 based on the content of the image classified into the layout region of the main content of the album by the image classification section 260. Additionally, the back cover unit template selecting section 295 selects one of the plurality of back cover unit templates stored in the back cover unit template storage section 280 based on the content of the image classified into the layout region of the back cover of the album by the image classification section 260. Thereby the album creating apparatus 130 can appropriately lay out the images of the cover, the main content and the back cover. Here, in order to select the unit template for each of the layout region in the main content when the main content includes the plurality of layout regions, a plurality of main content unit template selecting sections 294 may be provided.

Specifically, the cover unit template selecting section 293 selects one of the plurality of cover unit templates stored in the unit template storage section 280 based on the content of the image included in the image group classified into the layout region of the cover by the image classification section 260. Then, the template similarity calculating section 296 calculates the similarity between the cover unit template selected by the cover unit template selecting section 293 and each of the plurality of main content unit templates stored in the unit template storage section 280. Then, the main content unit template selecting section 294 selects one main content unit template of which similarity calculated by the template similarity calculating section 296 is higher than a predetermined similarity among the plurality of main content unit templates stored in the unit template storage section 280.

Then, the template similarity calculating section 296 calculates the similarity between one main content unit template selected by the main content unit template selecting section 294 and each of the plurality of main content unit templates stored in the unit template storage section 280. Then, the main content unit template selecting section 294 selects one main content unit template of which similarity calculated by the template similarity calculating section 296 is higher than a predetermined similarity as a main content unit template for the next layout region in the main content of the album. Here, the main content unit template selecting section 294 may select a plurality of main content unit templates among the plurality of main content unit templates stored in the unit template storage section 280 and also may select one main content unit template of which similarity calculated by the template similarity calculating section 296 is higher than a predetermined similarity.

Then, the template similarity calculating section 296 calculates the similarity between the main content unit template selected by the main content unit template selecting section 294 and each of the plurality of back cover unit templates stored in the unit template storage section 280. Then, the back cover unit template selecting section 295 selects one back cover unit template of which similarity is higher than a predetermined similarity calculated by the template similarity calculating section 296 among the plurality of back cover unit templates stored in the unit template storage section 280. Thereby the album crating apparatus 130 can create an album with a defied design.

Here, the cover unit template selecting section 293 and the main content unit template selecting section 294 are examples of the first unit template selecting section and the second unit template selecting section according to the present invention, respectively. Additionally, the main content unit template selecting section 294 and the back cover unit template selecting section 295 are examples of the first unit template selecting section and the second unit template selecting section according to the present invention, respectively.

Here, the template similarity calculating section 296 may calculate the similarity based on the shape of the image layout frame defined in the first unit template selected by the first unit template selecting section and the shape of the image frame defined in each of the plurality of second unit templates stored in the unit template storage section 280. For example, the template similarity calculating section 296 may calculate the similarity based on the degree of circular shape and the index indicative of the size of the average curvature in the image frame. Additionally, the template similarity calculating section 296 may calculate the similarity based on the index indicative of the ratio between the area for the circumscribed rectangle and the area for the layout frame, and the number of the corners of the layout frame.

The image classification storage section 270 stores the classification of the image to be laid out into the layout frame for the image in association with the image layout frame defined in each of the plurality of unit templates stored in the unit template storage section 280.

The image classification extracting section 272 extracts the classification of the image included in the image group classified by the image classification section 260. Then, the degree of matching calculating section 240 compares the classification of the image extracted by the image classification extracting section 272 with the image classification stored in the image classification storage section 270 to calculate, for each unit template, the degree of matching of the plurality of unit templates stored in the unit template storage section 280 with the image group classified into each layout region by the image classification section 260. Then, the unit template selecting section 290 preferentially selects the first unit template calculated by the degree of matching calculating section 240 as that its degree of matching with the first image group is higher among the plurality of first unit templates stored in the unit template storage section 280 and also preferentially selects the second unit template calculated by the degree of matching calculating section 240 as that its degree of matching with the second image group is higher among the plurality of second unit templates stored in the unit template storage section 280.

The image capturing condition storage section 250 stores the image capturing condition for each of the plurality of images stored in the image storage section 204 in association with each of the plurality of images stored in the image storage section 204. For example, the image capturing condition storage section 250 stores the focal distance for each of the plurality of images stored in the image storage section 204. The image capturing condition storage section 250 stores the image capturing mode for each of the plurality of images stored in the image storage section 204. The image classification storage section 270 may store the image capturing mode at image capturing as the classification of the image to be laid out into the image layout frame.

Then, the image classification extracting section 272 extracts the focal distance stored in the image capturing condition storage section 250 as the classification of the image included in the image group classified by the image classification section 260. Then, the degree of matching calculating section 240 calculates, for each unit template, the degree of matching of the plurality of unit templates stored in the unit template storage section 280 with the image group classified into each layout region by the image classification section by comparing the focal distance extracted by the image classification extracting section 272 with the focal distance stored in the image classification storage section 270. Additionally, the image classification extracting section 272 extracts the image capturing mode stored in the image capturing condition storage section 250 as the classification of the image included in the image group classified by the image classification section 260. Then, the degree of matching calculating section 240 calculates, for each unit template, the degree of matching of the plurality of unit templates stored in the unit template storage diction 280 with the image group classified into each layout region by the image classification section 260 by comparing the image capturing mode extracted by the image classification extracting section 272 with the image capturing mode stored in the image classification storage section 270.

As described above, the image classification extracting section 272 extracts the image capturing condition stored in the image capturing condition storage section 250 as the classification of the image included in the image group classified by the image classification section 260. Then, the degree of matching calculating section 240 compares the image capturing condition extracted by the image classification extracting section 272 with the capturing condition of the image stored in the image classification storage section 270 to calculate, for each unit template, the degree of matching of the plurality of unit templates stored in the unit template storage section 280 with the image group classified into each layout region by the image classification section 260.

Here, the image classification storage section 270 may store the type of the subject included in the image as the classification of the image to be laid out into the image layout frame. Then, the image classification extracting section 272 may extract the type of the subject included in the image based on the content of the image included in the image group classified by the image classification section 260. Then, the degree of matching calculating section 240 compares the type of the subject extracted by the image classification extracting section 272 with the type of the subject stored in the image classification storage section 270 to calculate, for each unit template, the degree of matching of the plurality of unit templates stored in the unit template storage section 280.

The image group dividing section 262 divides the plurality of images stored in the image storage section 204 into a plurality of image groups. For example, the image group dividing section 262 may divide the plurality of images stored in the image storage section 204 into the plurality of image groups based on the image capturing time for each of the plurality of images. Additionally, the image group dividing section 262 may divide the plurality of images stored in the image storage section 204 into a plurality of image groups based on the image capturing position for each of the plurality of images. Here, the image group dividing section 262 may divide the plurality of images stored in the image storage section 204 into at least the number of image groups equal to the number of layout regions in the album.

The image group selecting condition storage section 266 stores a selecting condition for the classification of the image included in the image group among the plurality of image groups to select a plurality of image groups classified into continuous layout regions. The image group coincidence calculating section 264 calculates an image group coincidence indicative of the coincidence with the selecting condition stored in the image group selecting condition storage section 266 based on the classification of the image included in the plurality of image group. Then, the image group allocating section 268 preferentially classifies the image group calculated by the image group coincidence calculating section 264 as that its coincidence with the first image group is higher into a second layout region continuing to the first layout region.

The unit template selecting condition storage section 232 stores the selecting condition for the design form defined by the unit template among a plurality of unit templates to select the plurality of unit templates to define the design form for each of the continuous layout regions. Then, the unit template coincidence calculating section 230 calculates a unit template coincidence indicative of the coincidence with the selecting condition stored in the unit template selecting condition storage section 232 among the plurality of unit templates stored in the unit template storage section 280 based on the design form defined by the plurality of unit templates stored in the unit template storage section 280.

The image layout section 286 selects, for the combination of the plurality of image groups divided by the image group dividing section 262 and the plurality of second unit templates stored in the unit template storage section 280, a set of the image group to be classified into the second layout region continuing to the first layout region and the second unit template to define the design form of the second layout region based on the unit template coincidence with the first template selected by the first unit template selecting section 290 which is calculated by the template coincidence calculating section, the image group coincidence with the first image group calculated by the image group calculating section 264 and the degree of matching of the second unit template with the image group calculated by the degree of matching calculating section 240. The viewer of the album likely feel uncomfortable about an album in which the layout is substantially changed in the continuous layout regions or an album in which the layout is not changed at all. However, the album creating apparatus 130 can easily make an album having pages in which the layout is appropriately changed in the continuous layout regions and the design of the template is matched with the content of the image.

As described above, the album creating apparatus 130 can have the appropriate layout dependent on the content of the image and ensure the total uniformity of the album. Accordingly, the user can easily obtain the album with the layout and design without feeling uncomfortable using the album creating apparatus 130.

FIG. 3 shows an example of the classification of the image designated in a layout frame. The unit template storage section 280 stores a plurality of image classifications indicative of a combination of the image classifications to be laid out into the layout region. The image classification may include an image capturing condition at which the image is captured. The image capturing condition may be a focal distance, a white balance and a presence/absence of a flash. Additionally, the image classification may be information indicating that the image is captured in a predetermined image capturing mode. For example, the image capturing mode may be an operation mode of the image capturing apparatus, such as a background mode, a close view mode, a portrait mode and a night view mode.

Additionally, the image classification may include information indicative of the captured image of a certain type of image. For example, the image classification may include information indicative of a landscape, a person and a building. Additionally, the image classification may include information indicative of the number of persons if the image classification is a person.

Further, the image classification may include information indicative of an image in a predetermined direction. For example, the image classification may include information indicating that the image is in the longitudinal direction or the lateral direction. The image classification may include information indicating that the image has a predetermined direction component and information indicating that the direction to which the object included in the image goes the vanishing point is a predetermined direction. Additionally, the image classification may include information indicative of a panorama image. The image classification may include information indicative of at least one of the size of the subject, the orientation of the subject and the position of the subject. Here, the size, the orientation and the position may be the size, the orientation and the position of the main subject in the image. Additionally, the image classification may include information indicative of a clipping image.

The unit template storage section 280 stores free combinations of the above-described image classifications and the information indicative of the combinations therewith. For example, an image classification #302 indicates an image in which the image capturing mode is the portrait mode and the kind of the subject is a person. Additionally, an image classification #303 indicates an image in which the white valance is a sunlight mode, the type of the subject is a plurality of persons and the image is in the lateral direction. Here, those of the image classifications are stored in the image classification storage section 270 of the unit plate storage section 280.

FIG. 4 shows example of unit templates stored in the unit template storage section 280. The first design form template storage section 281 stores cover unit templates (401, 402, . . . ), main content unit templates (411, 412, 413, 414, 415, 416, . . . ) and back cover unit templates (421, 422, . . . ) which are designed by a designer D1. Meanwhile, the second design form template storage section 282 stores cover unit templates (431, 432 . . . ), main content unit templates (441, 442, 443, . . . ) and back cover unit templates (451, 452, . . . ).

Here, the unit templates storage section 280 may include the unit templates of which ratio between the length and the width in the layout region is different each other. For example, the page of a main content unit template 415 and the page of a main content unit template 416 are in the different direction each other.

Then, the layout frame to define the region into which an image is laid out is determined in each of the unit templates. Then, the unit template storage section 280 stores, for each layout frame, the classification of the image to be laid out into each layout frame. As shown in FIG. 4, in the cover unit template 401, a matter indicating that the image of the image classification #301 should be laid out into the layout frame 461 to define the region into which the image is laid out is stored. In the same way, a matter indicating that the image of the image classification #302 should be laid out into the layout frame 462 in the cover template. Additionally, a matter indicating that each image of an image classification #301 and an image classification #303 should be laid out into a layout frames 463 and 464 in the content unit template 411. Further, the unit template storage section 280 may define a matter indicating that the image having the classification is a clipping image should be laid out in the layout frame. For example, a matter indicating that the clipping image of the person should be laid out is defined in a layout frame 465. Meanwhile a matter indicating that the clipping image except for any person should be laid out is defied in a layout frame 466. Additionally, a matter indicating that the image should be laid out at a slant may be defined in the image frame such as a layout frame 467, 468 and 469. Further, a matter indicating that the image should be laid out ahead of the image of the other layout frame (467, 468 and 469).

Then, the unit template selecting section 290 judges the image classification classified into each page by the image classification section 260 and selects the unit template in which the matter indicating that the judged image classification is laid out in the layout frame is stored therein among the unit templates stored in the unit template storage section 280. Therefore, the album creating apparatus 130 can flexibly combine design data adapted to the content of the images classified into each page among design data by the designer for each page which are received from the server 110 to create an album. Here, laying out the image, the image layout section 286 executes an image processing to match the direction component and the size, the orientation and the position of the subject included as the image classification designated in the layout frame with the direction component of the laid out image and the size, the orientation and the position, and then, the image layout section 286 may lay out the image into the layout frame. As for such an image processing, the combination of an affine transformation and a trimming processing can be used. Additionally, when the image classification indicative of a clipping image is designated in the layout frame at laying out the image into the layout frame, the image layout section 286 may trim a specified subject from the image and lay out the same into the layout frame. Here, the specified subject may be a main subject specified as the main subject in the image by the image layout section 286 and also may be the subject designated by the user. At this time, the image layout section 286 may specify a subject positioned in a region including a focal point such as the center region of the image and a subject having the maximum area in the image as the main subject.

Figure 5:
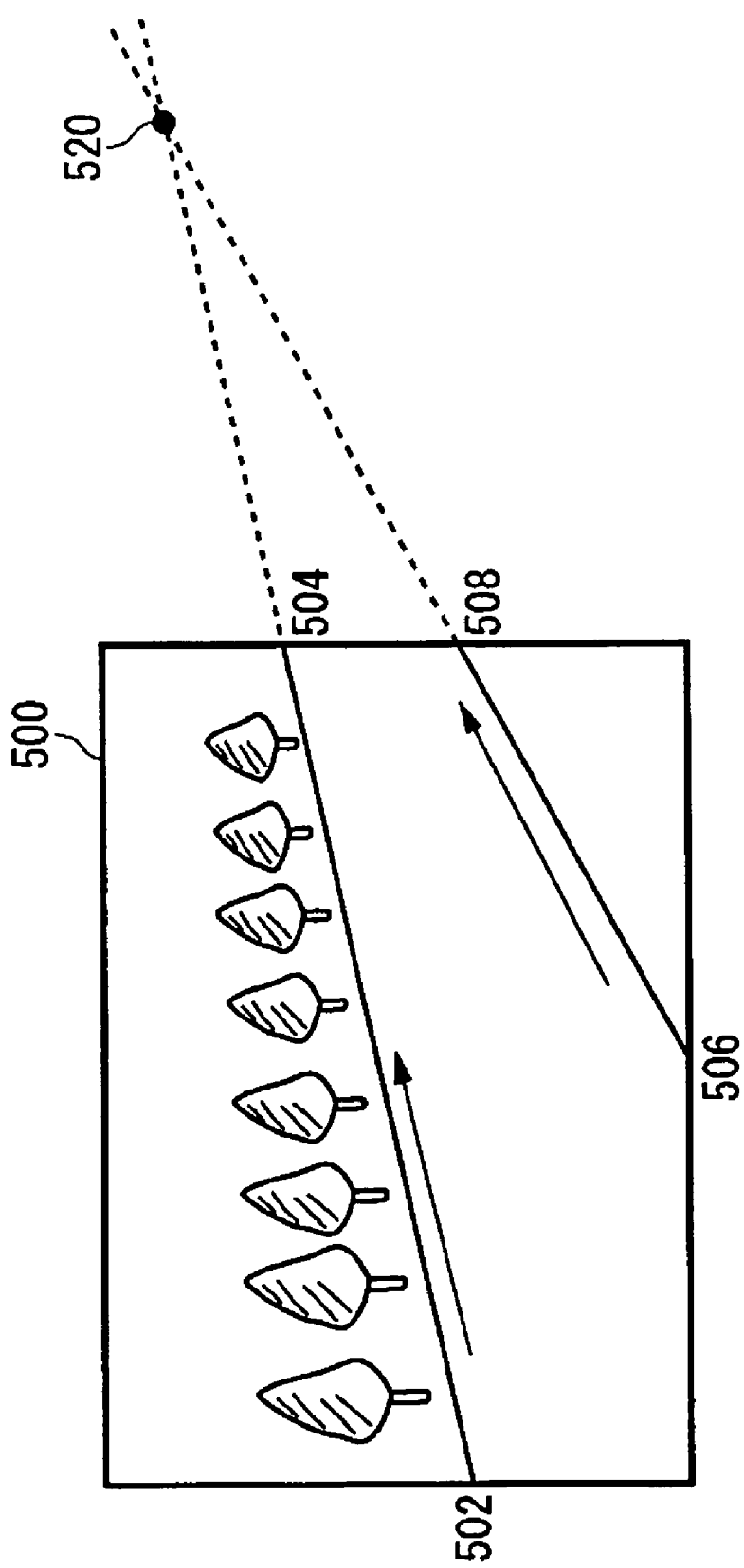
FIG. 5 shows an example of a method of calculating the direction component and the vanishing point of the image.

FIG. 5 shows an example of a method of calculating the direction component and the vanishing point. The unit template selecting section 290 may calculate the intersection at which the lines are intersected as the vanishing point through Hough transform. For example, the intersection at which the extended line of the straight line obtained by connecting an end 502 to an end 504 of the road included in an captured image 500 is intersected with extended line of the straight line obtained by connecting an end 506 and an end 508 of the road can be as a vanishing point 520. Then, the unit template selecting section 290 may specify that the direction to the calculated vanishing point is the position component of the image. Then, the unit template selecting section 290 can specify the direction component and/or the vanishing point and appropriately lay out each image into the layout frame including the image classification corresponding the specified direction component and/or vanishing point.

Figure 6:
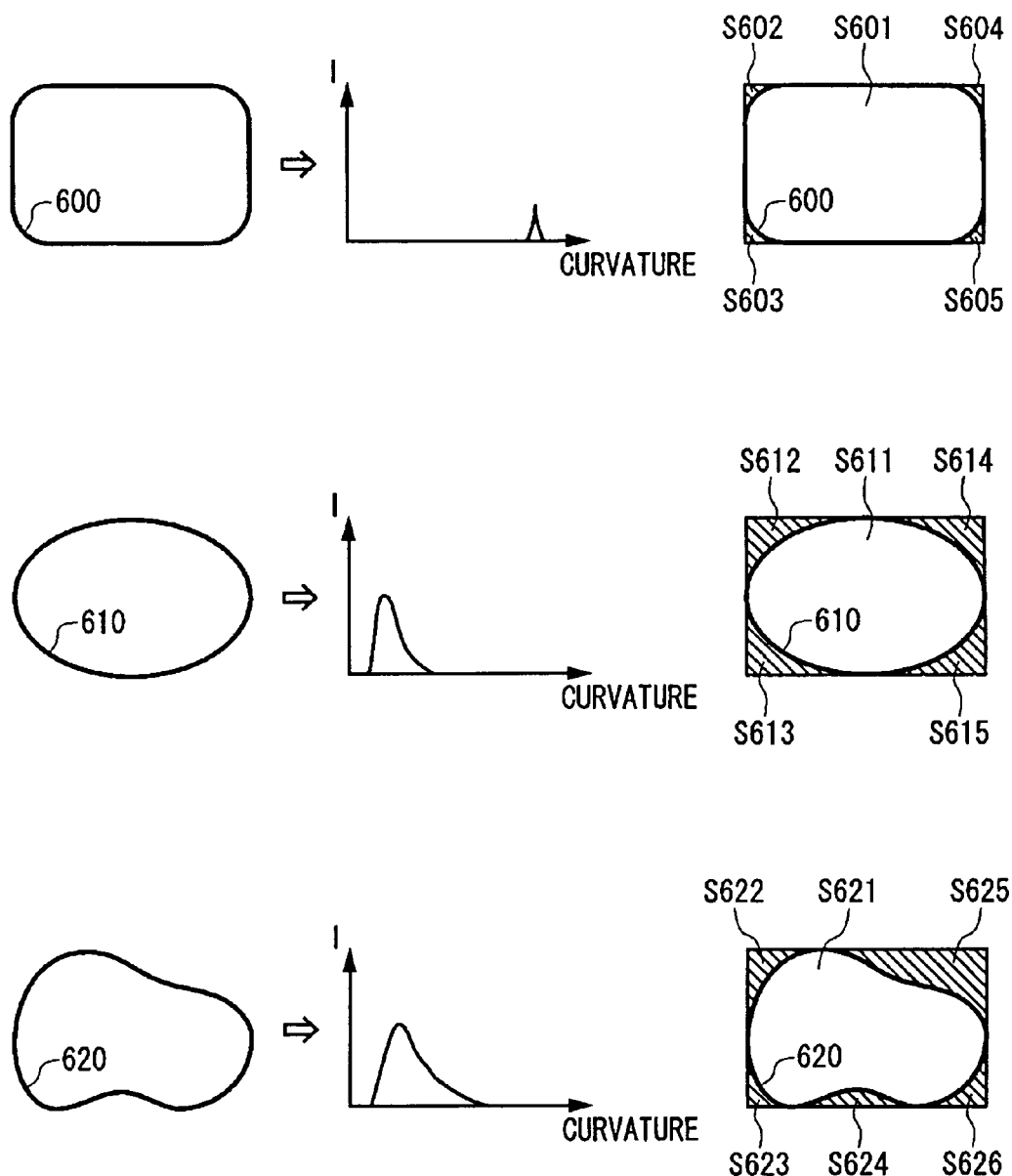
FIG. 6 shows an example of a method of judging the similarity of the shape of layout frames.

FIG. 6 shows an example of a method of judging the similarity of the shape of layout frames. The template similarity calculating section 296 calculates the curvature distribution of the layout frame and calculates the similarity of the curvature distribution as the similarity of the shape of the layout frame. For example, the template similarity calculating section 296 calculates the curvature distribution in each layout frame and then, calculates the average value in the curvature distribution and the degree of curvature distribution. Then, the template similarity calculating section 296 may determine that the ratio of the average value in the calculated curvature distribution and/or the ratio of the degree of curvature distribution may be the index of the similarity. For example, the template similarity calculating section 296 calculates the similarity between a layout frame 520 and a layout frame 510 higher than the similarity between a layout frame 620 and a layout frame 600. Additionally, the template similarity calculating section 296 calculates an integral value along the layout frame for the curvature and determine that the ratio of the integral value is the index of the similarity.

Additionally, the template similarity calculating section 296 may determine that the amount of transformed from the rectangle of the layout frame is the index of the similarity. For example, the template similarity calculating section 296 calculates, for each layout frame, the value obtained by dividing the value of the different between the area for the circumscribed rectangle and the area for the region surrounded by the layout frame by the area for the region surrounded by the layout frame as the amount of transform. For example, the amount of transform of the image frames 600, 610 and 620 is indicated by (S602+S603+S604+S605)/S601, (S612+S613+S614+S615)/S611 and (S622+S623+S624+S625+S626)/S621. Then, the template similarity calculating section 296 may determine that the ratio of the amount of transform between the layout frames each other is the similarity of the index. For example, the template similarity calculating section 296 calculates that the similarity between the layout frame 620 and the layout frame 610 is higher than the similarity between the layout frame 620 and the layout frame 600. Thereby the album creating apparatus 130 can previously prevent the album from being created with the design which is not unified for the viewer, such that a rectangular layout frame and an elliptical layout frame are included in the same page.

Figure 7:
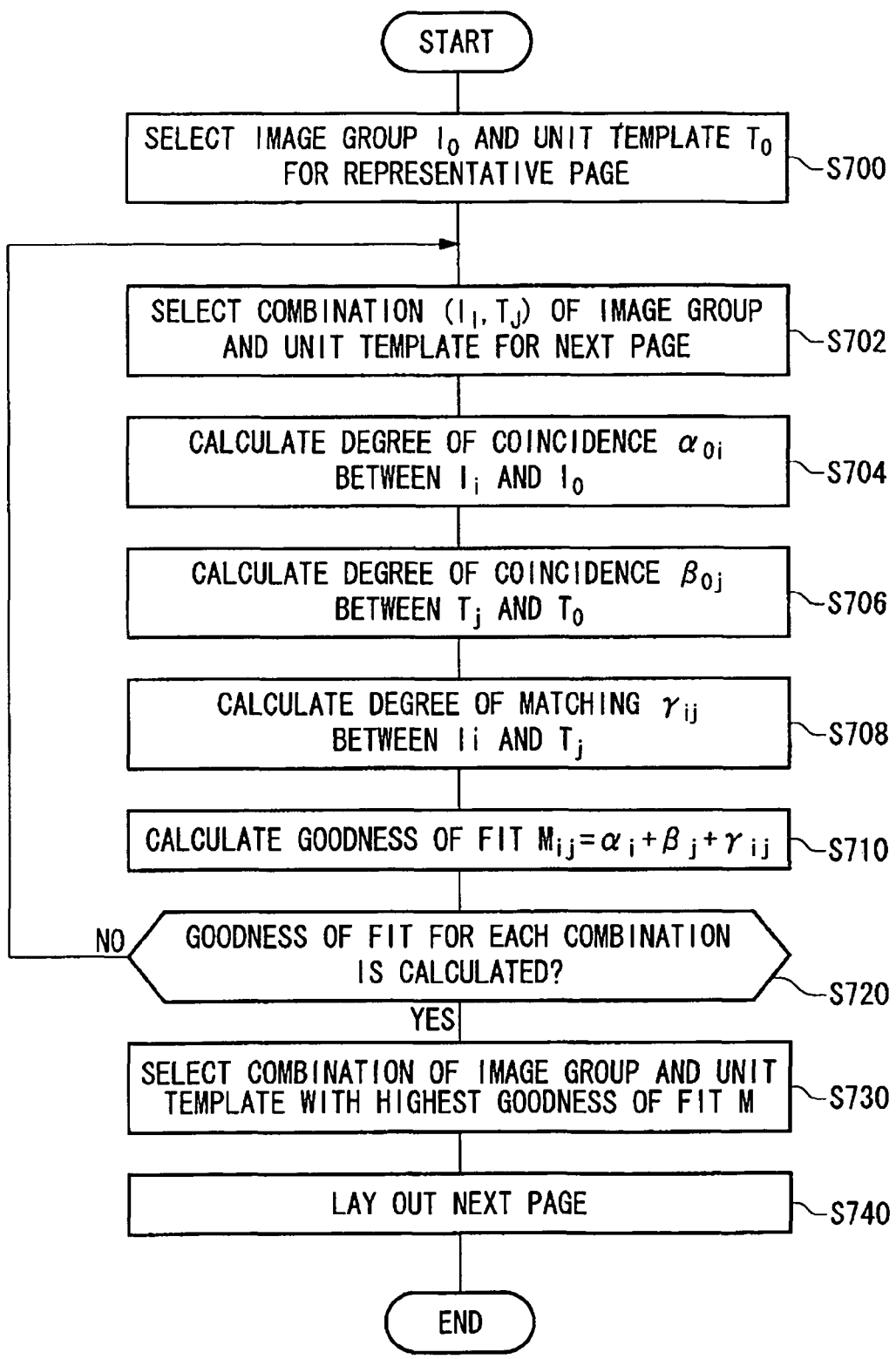
FIG. 7 is a flowchart showing a processing to determine the combination of unit templates and image groups.

FIG. 7 is a flowchart showing a processing to determine the combination of unit templates and image groups. The processing as shown in FIG. 7 is an example of a processing to determine the combination of a unit template in which the design form of the page following a representative page and the image group classified into the page following the representative page after the combination of a unit template in which the representative page included in the main content of the album and the image group classified into the representative page.

The optimum layout determining section 220 selects an image group $I_0$ of the representative page in the main content of the album and a unit template $T_0$ (S700). Then, the optimum layout determining section 220 selects a combination $(I_i, T_j)$ among all the combination of the plurality of unit templates and the plurality of image groups (S702). Then, the image group coincidence calculating section 264 calculates the image group coincidence $\alpha_{0i}$ between the image group $I_i$ and the image group $I_0$ (S704). The method of calculating the image group coincidence by the image group coincidence 264 will be described with reference to FIG. 10 and FIG. 11. Then, the unit template coincidence calculating section 230 calculates a unit template coincidence $\beta_{0i}$ between the image group $T_i$ and the image group $T_0$ (S706). The method of calculating the unit template coincidence by the unit template coincidence calculating section 230 will be described with reference to FIG. 8 and FIG. 9.

Then, the degree of matching calculating section 240 calculates a degree of matching $\gamma_{ij}$ between an image $I_i$ and a unit template $T_j$. A method of matching the degree of matching $\gamma$ by the degree of matching calculating section 240 will be described with reference to FIG. 12.

Then, the optimum layout determining section 220 calculates a goodness of fit $M_{ij}$ between a combination $(I_0, T_0)$ and a combination $(I_i, T_j)$. Specifically, the optimum layout determining section 220 determines that the total value of the image coincidence $\alpha_{0i}$, the unit template coincidence $\beta_{0j}$ and the degree of matching $\gamma_{ij}$ which are calculated in S704, 706 and 708 as the goodness of fit $M_{ij}$. Here, the optimum layout determining section 220 may determine that a preset weighted total value of the image coincidence $\alpha_{0i}$, the unit template coincidence $\beta_{0j}$ and the degree of matching $\gamma_{ij}$ as the goodness of fit $M_{ij}$. Each weighting factor may be selected by the album creator and also may be previously determined by the designer who designed the series of templates. For example, when an album having the design with a high regard for the goodness of fit of the templates among the pages, the weighting factor of the unit template coincidence $\beta_{0i}$ may be set higher than the weighting factor of the image coincidence $\alpha_{0i}$. Additionally, when an album having the design with a high regard for the goodness of fit of the images among the pages, the weighting factor of the image coincidence $\alpha_{0i}$ may be set higher than the weighting factor of the unit template coincidence $\beta_{0i}$. Further, when an album having the design with a high regard for the degree of matching between the template and the image group in the page, the weighting factor of the degree of matching $\gamma_{0i}$ may be set higher than the weighting factor of the image coincidence $\alpha_{0i}$ and the weighting factor of the unit template coincidence $\beta_{0i}$.

Then, the optimum layout determining section 220 determines whether the goodness of fit of all the combinations of the unit templates and the image groups are calculated (S720). Otherwise, the optimum layout determining section 220 sifts the processing to the S702, selects the combination different from the combination $(I_i, T_j)$ in which the goodness of fit has been calculated and executes the processing the S704-S710 to calculate the good of fit. When it is determined that the goodness of fit of the combinations are calculated in the S720, the optimum layout determining section 220 selects the combination of the image group and the unit template in which the highest goodness of fit M is calculated (S730). Then, the main content unit template selecting section 294 selects the unit template indicated by the combination selected in the S730 as a unit template in which the design form of the page following the representative page. Additionally, the image group allocating section 268 allocates the image group indicated by the combination selected in the S730 as the image group classified into the page following the representative page. Then, the image layout section 286 lays out the image into the page following the representative page using the image group and the unit template (S740).

Hereinbefore, the processing flow through which the optimum combination of the page following the representative page is selected based on the combination ($I_0$, $T_0$) has been described. Additionally, the optimum combination in the page followed by the representative page can be based on the combination in the representative page in the main content, and the optimum combination in the page before/after the representative page through the processing the same as above. Further, the optimum combination in a plurality of continuous pages before/after the representative page can be determined through the processing the same as above. Furthermore, the optimum combination in the back cover can be determined based on the combination in the cover page, and the optimum combination in the first page of the main content can be determined based on the combination in the cover page through the processing the same as above.

FIG. 8 is a table showing an example of data stored in a unit template selecting condition storage section. The unit template selecting condition storage section 232 stores the coincidence with the selecting condition for the characteristic value in association with the difference of the characteristic value of the layout frame defined in two unit templates. The characteristic value of the layout frame includes the curvature of the layout frame, the number of layout frames and the total area of the layout frame. Here, the coincidence may be an index indicative of the preferability as the set of templates in which the page design form of the continuous pages is defined. Additionally, when one template includes a plurality of image frames, the curvature of the layout frame in the unit template may be the average value of the curvature value for the plurality of image frames.

As shown in FIG. 8, the unit template selecting condition storage section 232 stores that as for the curvature of the layout frame, a ratio 1 is corresponded to the degree of coincidence 811 and a ratio 2 is corresponded to the degree of coincidence 821. Additionally, the unit template selecting condition storage section 232 stores that as for the difference of the number of layout frames, the ratio 1 is corresponded to the degree of coincidence 812 and the ratio 2 is corresponded to the degree of coincidence 822. Then, the unit template coincidence calculating section 230 calculates the total value of the coincidence for each characteristic value of the layout frame as the degree of coincidence of unit template.

Here, the unit template selecting storage section 232 may store the threshold value of the unit template coincidence to select as a set of unit templates in which the design form of the page in which a set of specific templates are continued. Then, the unit template coincidence calculating section 230 may judge that the set of unit template in which the unit template coincidence more than the threshold value is calculated can be used for a unit template in which the design form of the continuous pages is defined.

FIG. 9 shows an example of a unit template coincidence β calculated in all the sets of unit templates. As shown in FIG. 9, $\beta_{01}$, is calculated as the degree of coincidence of unit template when the unit templates in which the design form of two continuous pages in the album is $T_0$ and $T_1$. Then, the unit template coincidence calculating section 230 previously calculates the unit template coincidence β for all the combinations of the plurality of unit templates stored in the unit template storage section 280.

FIG. 10 is a table showing an example of data stored in an image group selecting condition storage section. The image group selecting condition selecting section 266 stores the degree of coincidence with the selecting condition for the characteristic value in association with the difference of the characteristic value between the images included in the two image groups. The characteristic value of image includes the image classification associated with FIG. 3, such as the characteristic color of image, the focal distance, the image capturing mode and, the type of subject. Here, the degree of coincidence may be an index indicative of the preferability as the set of image groups classified into the continuous pages. Here, when one image group includes a plurality of images, the image characteristic may be the color most included in the plurality of images, the focal distance may the average value of the focal distance for each of the plurality of images, the image capturing mode may be an image capturing mode most included the plurality of images and the type of subject may be a type of subject most included in the plurality of images.

As shown in FIG. 10, the image group selecting condition storage section 266 stores the difference of the characteristic color in association with the coincidence of image group. Where, a color difference 1 and a color difference 2 are corresponded to a degree of coincidence 1011 and a degree of coincidence 1021, respectively. The unit template selecting condition storage section 232 also stores the difference of the focal distance in association with the coincidence of image group. Where, a distance difference 1 and a distance difference 2 are corresponded to a degree of coincidence 1012 and a degree of coincidence 1022, respectively. Then, the image group coincidence calculating section 264 calculates the total value of the degree of coincidence for each characteristic value of the image as the degree of coincidence of image group.

The image group selecting condition storage section 266 may store the threshold value of the coincidence of image group to select as the set of the image group classified into the page in which the specified image groups are continued. Then, the image group coincidence calculating section 264 may judge that the set of image groups in which the degree of coincidence of image group more than the threshold value is calculated can be used as an image group to be classified into the continuous pages.

Figure 11:
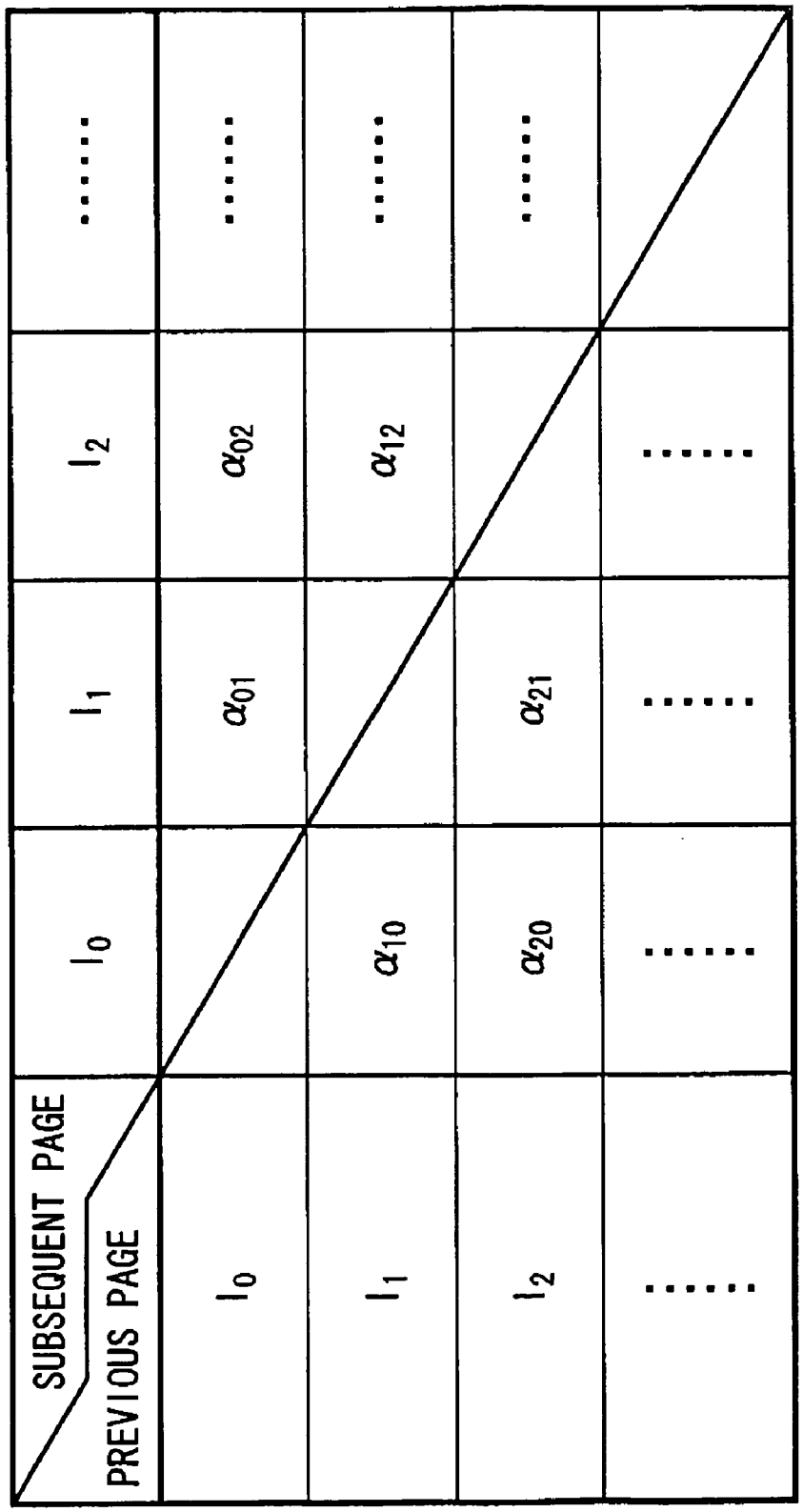
FIG. 11 shows an example of the degree of coincidence α of image group calculated in all the sets of image groups.

FIG. 11 shows an example of image group coincidence a calculated in all the sets of image groups. As shown in FIG. 11, $\alpha_{01}$ is calculated as the image group coincidence when the image groups classified into the continuous two pages in the album are $I_0$ and $I_1$. As shown in FIG. 11, the image group coincidence calculating section 264 previously calculates the degree of coincidence α of the unit template of all the sets of image groups divided by the image group dividing section 262 except for the set of the same image group.

FIG. 12 shows an example of the degree of matching γ calculated in all the sets of image groups and unit templates. As shown in FIG. 12, $\gamma_{00}$ is calculated as the degree of matching of a unit template $T_0$ with an image group $I_0$. The degree of matching calculating section 240 previously calculates a degree of matching γ between the image groups divided by the image group dividing section 262 with all the sets of unit templates stored in the unit template storage section 280.

For example, a method of calculating the degree of matching of one unit template with one image group by the degree of matching calculating section 240 as follows. The image classification extracting section 272 extracts the classification of the image described with reference to FIG. 3 from each of the images included in one image group divided by the image group dividing section 262. Then, the degree of matching calculating section 240 judges, for each image, whether the classification of the extracted image is matched with the classification of the image defined in the image frame. For example, the degree of matching calculating section 240 judges that a focal distance extracted from the image is matched with the image classification defined in the layout frame when the focal distance extracted from the image is included within the focal distance defined in the layout frame. The degree of matching calculating section 240 judges that it is matched for each item of the classification of the image described with reference to FIG. 3, such as a white balance, an image capturing mode and a type of subject, and then, when it is matched with all the items, the degree of matching calculating section 240 judges that the image frame is matched with the image. Then, the degree of matching calculating section 240 may judge whether the layout frame is matched with the image for all the combination of the layout frames and the images and determine that the number of images judged as the matched images with the layout frames is the degree of matching of the unit template with the image group.

As described above, the album creating apparatus 130 can flexibly combine the unit templates used for each page among the plurality of unit templates defined by a plurality of designers to create an album. For example, the album creating apparatus 130 can create an album with the combination of the unit templates having the design suitable for the content of the image in each page. Additionally, the album creating apparatus 130 automatically selects the unit template applied to each page of the album from the unit template having the similar design which is created by the same designer to create the album. Therefore, the album creating apparatus 130 easily provide the album with the unified design to the user.

Figure 13:
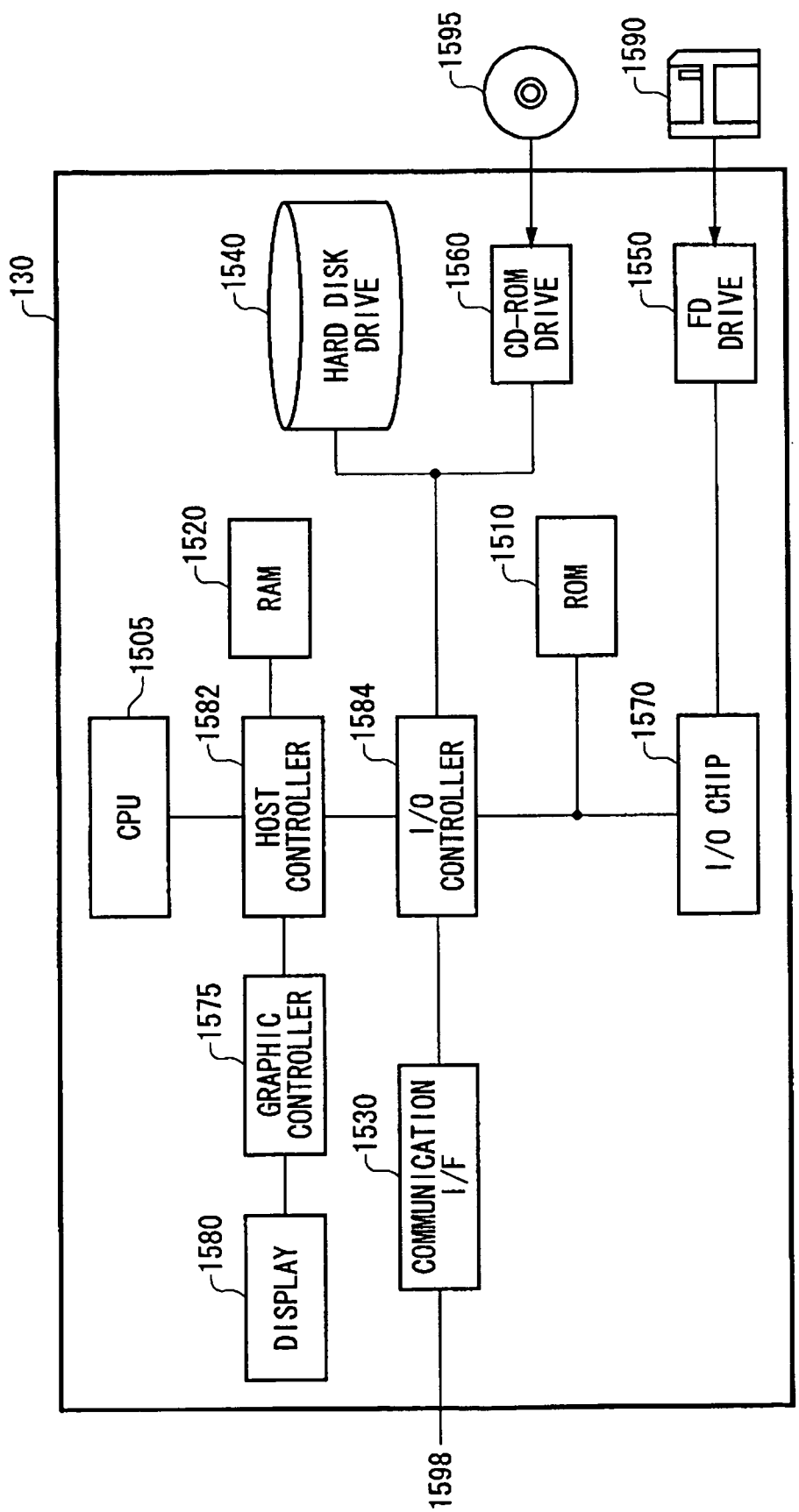
FIG. 13 shows an example of a hardware configuration of the album creating apparatus 130.

FIG. 13 shows an example of the hardware configuration of the album creating apparatus 130. The album creating apparatus 130 according to the present embodiment includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The hard disk drive 1540 stores the program and data used by the CPU 1505. The communication interface 1530 is connected to a network communication apparatus 1598 to receive/transmit the program or data. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the album creating apparatus 130 at activating and a program depending on the hardware of the album creating apparatus 130. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program executed by the CPU 1505 is stored in a recording medium, such as the flexible disk 1590, the CD-ROM 1595, or an IC card and provided by the user. The program stored in the recording medium may be compressed or not compressed. The program is installed to the hard disk drive 1540 from the recording medium, read to the RAM 1520 and executed by the CPU 1505.

The program executed by the CPU 1505 operates the album creating apparatus 130 to function as the image storage section 204, the image classification section 260, the album template storage section 284, the image layout section 286, the unit template storage section 280, the unit template selecting section 290, the unit template selecting condition storage section 232, the image capturing condition storage section 250, the degree of matching calculating section 240, the image classification extracting section 272, the image group selecting condition storage section 266 and the optimum layout determining section 220 which are described with reference to FIG. 1-6. Additionally, the program executed by the CPU 1505 operates the unit template storage section 280 to function as the first design form template storage section 281, the second design form template storage section 282, and the image classification storage section 270 which are described with reference to FIG. 1-12. Further, the program executed by the CPU 1505 operates the unit template selecting section 290 to function as the cover unit template selecting section 293, the main content unit template selecting section 294, the back cover unit template selecting section 295, and the unit template coincidence calculating section 230. Further, the program executed by the CPU 1505 operates the image classification section 260 to function as the image group dividing section 262, the image group coincidence calculating section 264, and the image group allocating section 268 which are described with reference to FIG. 1-12. Further, the program executed by the CPU 1505 operates the unit template coincidence calculating section 230 to function as the template similarity calculating section 296 described with reference to FIG. 1-FIG. 12.

The above-described programs may be stored in an external storage medium. The recording medium may be, in addition to the flexible disk 1590 and the CD-ROM 1595, an optical storage medium such as a DVD and a PD, a magneto-optical recording medium such as a MD, a tape medium and a semiconductor memory such as an IC card. Additionally, a storage medium such as a hard disk or a RAM which is provided in the server system connected to a private communication network or Internet is used as the recording medium to provide the program to the album creating apparatus 130 through the network.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An album creating apparatus comprising:

an album template storage section for storing a plurality of album templates to define a design form of an album;

a unit template storage section for storing a plurality of unit templates to define the design form of a partial layout region continuing in each of the plurality of album templates stored in the album template storage section;

an image storage section for storing a plurality of images placed on the album;

an image classification section for classifying the plurality of images stored in the image storage section for each layout region in which the design form is defined by the unit template based on the content of the image stored in the image storage section;

a unit template selecting section for selecting one of a plurality of first unit templates included in each of the plurality of album templates stored in the unit template storage section based on the content of the image included in a first image group classified by the image classification section, and for selecting one of a plurality of second unit templates included in each of the plurality of album templates stored in the unit template storage section based on the content of the image included in a second image group classified by the image classification section; and an image layout section for laying out the image included in the first image group classified by the image classification section into the layout region of the first unit template selected by the unit template selecting section, and for laying out the image included in the second image group classified by the image classification section into the layout region in the second unit template selected by the unit template selecting section, wherein the unit template storage section including:

a first design form template storage section for storing a unit template to define a design form similar to the first design form; and a second design form template storage section for storing a unit template to define a design form similar to a second design form different from the first design form, and wherein the unit template selecting section selects one of the plurality of second unit templates stored in the first design form template storage section when the unit template selecting section selects one of the plurality of first unit templates stored in the first design form template storage section, and selects one of the plurality of second unit templates stored in the second design form template storage section when the unit template selecting section selects one of the plurality of first unit templates stored in the second design form template storage section.

2. The album creating apparatus according to claim 1, wherein the first design form template storage section for storing the unit template to define the design form designed by a first designer, and the second design form template storage section stores the unit template to define the design form designed by a second designer.

3. The album creating apparatus according to claim 1, wherein the unit template storage section stores a plurality of cover unit templates to define the design form of a cover of the album, a plurality of main content unit templates to define the design form of a main content of the album, and a plurality of back cover unit template to define the design form of a back cover of the album, and wherein the unit template selecting section including:

a cover unit template selecting section for selecting one of the plurality of cover unit templates stored in the unit template storage section based on the content of the image classified into the layout region for the cover of the album by the album classification section;

a main content unit template selecting section for selecting one of the plurality of main content unit templates stored in the unit template storage section based on the content of the image classified into the layout region for the main content of the album by the image classification section; and a back cover unit template selecting section for selecting one of the plurality of back cover unit templates stored in the back cover unit template storage section based on the content of the image classified into the layout region for the back cover of the album by the image classification section.

4. An album creating apparatus comprising:

an album template storage section for storing a plurality of album templates to define a design form of an album;

a unit template storage section for storing a plurality of unit templates to define the design form of a partial layout region continuing in each of the plurality of album templates stored in the album template storage section;

an image storage section for storing a plurality of images placed on the album;

an image classification section for classifying the plurality of images stored in the image storage section for each layout region in which the design form is defined by the unit template based on the content of the image stored in the image storage section;

a unit template selecting section for selecting one of a plurality of first unit templates included in each of the plurality of album templates stored in the unit template storage section based on the content of the image included in a first image group classified by the image classification section, and for selecting one of a plurality of second unit templates included in each of the plurality of album templates stored in the unit template storage section based on the content of the image included in a second image group classified by the image classification section; and an image layout section for laying out the image included in the first image group classified by the image classification section into the layout region of the first unit template selected by the unit template selecting section, and for laying out the image included in the second image group classified by the image classification section into the layout region in the second unit template selected by the unit template selecting section, wherein the unit template storage section including:

a first unit template selecting section for selecting one of the plurality of first unit templates stored in the unit template storage section based on the content of the image included in the first image group classified by the image group classification section;

a template similarity calculating section for calculating the similarity between the first unit template selected by the first unit template selecting section and each of the plurality of second unit templates stored in the unit template storage section; and a second unit template selecting section for selecting one of the plurality of second unit templates stored in the template similarity calculating section, of which similarity calculated by the template similarity calculating section is larger than a predetermined similarity.

5. The album creating apparatus according to claim 4, wherein the similarity calculating section calculates the similarity based on the shape of the image layout frame defined by the first unit template selected by the first unit template selecting section and the shape of the image layout frame defined in each of the plurality of second unit templates stored in the unit template storage section.

6. An album creating apparatus comprising:
an album template storage section for storing a plurality of album templates to define a design form of an album;
a unit template storage section for storing a plurality of unit templates to define the design form of a partial layout region continuing in each of the plurality of album templates stored in the album template storage section;
an image storage section for storing a plurality of images placed on the album;
an image classification section for classifying the plurality of images stored in the image storage section for each layout region in which the design form is defined by the unit template based on the content of the image stored in the image storage section;
a unit template selecting section for selecting one of a plurality of first unit templates included in each of the plurality of album templates stored in the unit template storage section based on the content of the image included in a first image group classified by the image classification section, and for selecting one of a plurality of second unit templates included in each of the plurality of album templates stored in the unit template storage section based on the content of the image included in a second image group classified by the image classification section; and
an image layout section for laying out the image included in the first image group classified by the image classification section into the layout region of the first unit template selected by the unit template selecting section, and for laying out the image included in the second image group classified by the image classification section into the layout region in the second unit template selected by the unit template selecting section further comprising:
an image classification storage section for storing the classification of the image to be laid out into the image flame of an image in association with the image flame defined in each of the plurality of unit templates stored in the unit template storage section;
an image classification extracting section for extracting the classification of the image included in the image group classified by the image classification section; and
a degree of matching calculating section for calculating, for each unit template, the degree of matching of the plurality of unit templates stored in the unit template storage section with the image group classified into each of the layout regions by the image classification section by comparing the classification of the image extracted by the image classification extracting section with the image classification stored in the image classification storage section, wherein
the unit template selecting section preferentially selects the first unit template calculated by the degree of matching calculating section as that the matching degree with the first image group classified by the image classification section is larger, and preferentially selects the second unit template calculated by the degree of matching calculating section as that the matching degree with the second image group classified by the image classification section is higher.

7. The album creating apparatus according to claim 6 further comprising an image capturing condition storage section for storing the image capturing condition for each of the plurality of images stored in the image storage section, wherein
the image classification storage section stores the image capturing condition at which the image is captured as the classification of the image to be laid out into the layout frame for the image;
the image classification extracting section extracts the image capturing condition stored in the image capturing condition storage section as the classification of the image included in the image group classified by the image classification section;
the degree of matching calculating section calculates, for each unit template, the degree of matching of the plurality of unit templates stored in the unit template storage section with the image group classified into each layout region by the image classification section by comparing the image capturing condition extracted by the image classification extracting section with the image capturing condition stored in the image classification storage section.

8. The album creating apparatus according to claim 7, wherein
the image capturing condition storage section stores the focal distance for each of the plurality of images stored in the image storage section;
the image classification storage section stores the focal distance at image capturing as the classification of the image to be laid out into the layout frame;
the image classification extracting section extracts the focal distance stored in the image capturing condition storage section as the classification of the image included in the image group classified by the image classification section; and
the degree of matching calculating section calculates, for each unit template, the degree of matching of the plurality of unit templates stored in the unit template storage section with the image group classified into each layout region by the image classification section.

9. The album creating apparatus according to claim 7, wherein
the image capturing condition storage section stores an image capturing mode for each of the plurality of images stored in the image storage section;
the image classification storage section stores the image capturing mode at image capturing as the classification of the image to be laid out into the layout frame of the image;
the image classification extracting section extracts the image capturing mode stored in the image capturing condition storage section as the classification of the image included in the image group classified by the image classification section; and
the degree of matching calculating section calculates, for each unit template, the degree of matching of the plurality of unit templates stored in the unit template storage section with the image group classified into each layout region by the image classification section.

10. The album creating apparatus according to claim 6, wherein,
the image classification storage section stores the type of the subject included in the image as the classification of the image to be laid out into the image frame;
the image classification extracting section extracts the type of the subject included in the image based on the content of the image included in the image group classified by the image classification section; and the degree of matching calculating section calculates, for each unit template, the degree of matching of the plurality of unit templates with the image group classified into each layout frame by the image classification section by comparing the type of the subject extracted by the image classification extracting section with the type of the subject stored in the image classification storage section.

11. The album creating apparatus according to claim 6 further comprising an image group selecting condition storage section for storing a selecting condition for the classification of the image included in the image group in the plurality of image groups to select the plurality of image groups classified into the continuous layout regions, wherein the image classification section including:

an image group dividing section for dividing the plurality of images stored in the image storage section into a plurality of image groups;

an image group coincidence calculating section for calculating the degree of coincidence of image group indicative of the degree of coincidence with the selecting condition stored in the image group selecting condition storage section in the plurality of image groups divided by the image group dividing section; and an image group allocating section for classifying preferentially the image group calculated by the image group coincidence calculating section as that the degree of coincidence with the first image group classified into the first layout region is larger.

12. The album creating apparatus according to claim 11, wherein the unit template selecting section including:

a unit template selecting condition storage section for storing a selecting condition for the design form defined by the unit template in the plurality of unit templates to select the plurality of unit templates for each of the design form of the continuous layout regions;

a unit template coincidence calculating section for calculating the degree of coincidence of unit template with the selecting condition stored in the unit template selecting condition storage section in the plurality of unit templates stored in the unit template storage section based on the design form defined by the plurality of unit templates stored in the unit template storage section; and a first unit template selecting section for selecting one of the plurality of first unit templates stored in the unit template storage section based on the content of the image included in the first image group classified into the first layout region by the image classification section, and wherein the album creating apparatus further comprising:

an optimum layout determining section for selecting, for each combination of the plurality of image groups divided by the image group dividing section and the plurality of second unit templates stored in the unit template storage section, a set of the image group to be classified into a second layout region continuing to the first layout region and the second unit template to define the design form of the second layout region based on the degree of coincidence of unit template with the first unit template selected by the first unit template selecting section which is calculated by the template coincidence calculating section, the degree of coincidence of image group with the first image group calculated by the image group coincidence calculating section and the degree of matching of second unit template with the image group calculated by the degree of matching calculating section.

13. An album creating method comprising:

storing a plurality of album templates to define a design form of an album;

storing a plurality of unit templates to define the design form of a partial layout region continuing in each of the plurality of album templates stored in the album template storing step;

storing a plurality of images placed on the album;

classifying the plurality of images stored in the image storing step for each layout region in which the design form is defined by the unit template based on the content of the image stored in the image storing step;

selecting one of a plurality of first unit templates included in each of the plurality of album templates stored in the unit template storing step based on the content of the image included in a first image group classified in the image classifying step, and selecting one of a plurality of second unit templates included in each of the plurality of album templates stored in the unit template storing step based on the content of the image included in a second image group classified in the image classifying step; and laying out the image included in the first image group classified in the image classifying step into the layout region of the first unit template selected in the unit template selecting step, and laying out the image included in the second image group classified in the image classifying step into the layout region in the second unit template selected in the unit template selecting step; and wherein the unit template storage section including:

a first unit template selecting section for selecting one of the plurality of first unit templates stored in the unit template storage section based on the content of the image included in the first image group classified by the image group classification section;

a template similarity calculating section for calculating the similarity between the first unit template selected by the first unit template selecting section and each of the plurality of second unit templates stored in the unit template storage section; and a second unit template selecting section for selecting one of the plurality of second unit templates stored in the template similarity calculating section, of which similarity calculated by the template similarity calculating section is larger than a predetermined similarity.

14. A computer-readable medium encoded with a program for an album creating apparatus for creating an album, the program operates the album creating apparatus to function as:

an album template storage section for storing a plurality of album templates to define a design form of an album;

a unit template storage section for storing a plurality of unit templates to define the design form of a partial layout region continuing in each of the plurality of album templates stored in the album template storage section;

an image storage section for storing a plurality of images placed on the album;

an image classification section for classifying the plurality of images stored in the image storage section for each layout region in which the design form is defined by the unit template based on the content of the image stored in the image storage section;

a unit template selecting section for selecting one of a plurality of first unit templates included in each of the plurality of album templates stored in the unit template storage section based on the content of the image included in a first image group classified by the image classification section, and for selecting one of a plurality of second unit templates included in each of the plurality of album templates stored in the unit template storage section based on the content of the image included in a second image group classified by the image classification section;

an image layout section for laying out the image included in the first image group classified by the image classification section into the layout region of the first unit template selected by the unit template selecting section, and for laying out the image included in the second image group classified by the image classification section into the layout region in the second unit template selected by the unit template selecting section; and wherein the unit template storage section including:

a first unit template selecting section for selecting one of the plurality of first unit templates stored in the unit template storage section based on the content of the image included in the first image group classified by the image group classification section;

a template similarity calculating section for calculating the similarity between the first unit template selected by the first unit template selecting section and each of the plurality of second unit templates stored in the unit template storage section; and a second unit template selecting section for selecting one of the plurality of second unit templates stored in the template similarity calculating section, of which similarity calculated by the template similarity calculating section is larger than a predetermined similarity.

* * * * *